United States Patent
Bickbau (10) Patent No.: US 9,505,659 B2
(45) Date of Patent: Nov. 29, 2016

(54) METHOD FOR PRODUCING NANO-CEMENT, AND NANO-CEMENT

(71) Applicant: Marsel Yanovich Bickbau, Moscow (RU)

(72) Inventor: Marsel Yanovich Bickbau, Moscow (RU)

(*) Notice: Subject to any disclaimer, the term of this patent is extended or adjusted under 35 U.S.C. 154(b) by 0 days.

(21) Appl. No.: 14/952,450

(22) Filed: Nov. 25, 2015

(65) Prior Publication Data

US 2016/0159692 A1 Jun. 9, 2016

Related U.S. Application Data

(63) Continuation of application No. PCT/RU2013/000917, filed on Oct. 17, 2013.

(30) Foreign Application Priority Data

Mar. 18, 2013 (RU) .............................. 2013111651

(51) Int. Cl.
| | |
|---|---|
| *C04B 28/04* | (2006.01) |
| *C04B 7/52* | (2006.01) |
| *C04B 20/10* | (2006.01) |
| *B82Y 30/00* | (2011.01) |

(52) U.S. Cl.
CPC .............. *C04B 28/04* (2013.01); *C04B 7/527* (2013.01); *C04B 20/1033* (2013.01); *B82Y 30/00* (2013.01); *Y02P 40/20* (2015.11)

(58) Field of Classification Search
CPC ... C04B 28/04; C04B 7/527; C04B 20/1033; B82Y 30/00; Y02P 40/20; Y10T 428/2982
USPC ............................................... 428/407; 524/3
See application file for complete search history.

(56) References Cited

U.S. PATENT DOCUMENTS 4,933,013 A * 6/1990 Sakai .................. C04B 7/32
106/707

FOREIGN PATENT DOCUMENTS

| EP | 877007 | * | 6/2004 |
| RU | 2371402 | | 7/2009 |
| RU | 2371402 | * | 10/2009 |

OTHER PUBLICATIONS

Batrakov et al., Modifitsirovannye betony. Teariya i praktika. Izd. 2-e, pererabotannoe i dopolnennoe. Moscow. 1998, p. 593-621.*
Bikbau et al, Nanotsement, StroiPPROFI N. 7, May 10, 2012, p. 1-4.*
Guz V.A., Zharko V.I., Kabanov A.A., Vysotsky E.V. Russian Cement Industry in 2011 // J. Cement and its Applications, 2012, No. 12, pp. 28-32.
Thomas Deuse. From Mikrodur to Nanodur Technology. Use of Standard Cement in Production of Concretes with Superhigh Operation Properties // J. Concrete Plant, 2009, No. 3, pp. 4-11.
Kravchenko I.V., Kuznetsova T.V., Vlasov M.T., Yudovich B.E. Chemistry and Technology of Special Cements—M. Stroyizdat, 1979, 208 p.
Bikbau M.Ya. Nanotechnologies in Cement Production.—M.: OJSC Moscow Institute of Materials Science and Efficient Technologies, 2008, 768 p.
Bikbau M.Ya. Discovery of Nano-Encapsulation Phenomenon for Dispersed Materials // J. Vestnik Raen, Physics, 2012, V. 12, No. 3, pp. 27-35.
Bikbau M.Ya., Vysotsky D.V., Tikhomirov I.V., Nanocement-Based Concrete: Properties and Prospects // J. Building Materials, Equipment and Technologies of the XXIst Century. Concrete Technology. 2011, Nos. 11-12, pp. 20-24.
Bikbau M.Ya. Nanocement as the Basis of Effective Modernization of Precast Concrete Plants // J. Concrete Products and Structures. 2012. No. 1. pp. 38-42.
Afanasyeva V.F. Testing Results for Nanocement-Based Concretes. // J. Building Materials, Equipment and Technologies of the XXIst Century. Concrete Technology. 2012, Nos. 9-10, pp. 16-17.
Bikbau M.Ya. New Cements and Concretes. Discovery of Nano-Encapsulation Phenomenon for Dispersed Materials // J. Concrete Products and Structures. 2012. No. 4. pp. 64-72.
Bikbau M.Ya. The development of Cement Industry in Russia. Where to Go? // J. Construction Orbit. 2012, No. 11 (109), pp. 30-34.
Invention Certificate of the USSR No. 2254668, cl. C04 B 7/354, 1976.

* cited by examiner

*Primary Examiner* — Leszek Kiliman
(74) *Attorney, Agent, or Firm* — Lambert & Associates; Gary E. Lambert; David J. Connaughton, Jr.

(57) ABSTRACT

The invention is related to nanocement production methods by modifying Portland cement, as well as to nanocement compositions. The nanocement production method involves a mechanochemical activation of dispersed grains of Portland cement in the presence of polymeric modifier, with the sodium naphthalenesulfonate content of at least 60 wt %, mineral siliceous additive containing at least 30 wt % $SiO_2$ and gypsum, to form continuous nanoshells—capsules of 20-100 nm in thickness on Portland cement grains made of sodium naphthalenesulfonate structured by calcium cations.

18 Claims, 4 Drawing Sheets

METHOD FOR PRODUCING NANO-CEMENT, AND NANO-CEMENT

TECHNICAL FIELD

This invention is related to a cement technology such as a nanocement production by modifying Portland cement, composition and morphology of nanocement according to the proposed method.

BACKGROUND OF INVENTION

The invention of cement and concrete is an outstanding achievement of mankind that enabled the construction of industrial housing, engineering facilities, and transport highways around the planet. Today, almost everything is built with the help of Portland cement: the annual production exceeded 3 billion tons for cement and over 10 billion tons for concrete, and it continues to grow rapidly: concrete dams and roadways, piers and airfields, bridges and stadiums, TV towers and skyscrapers, billions meters of housing per year.

Dozens of new enterprises in China, India, Latin America and other developing countries are annually added to thousands of existing cement plants.

The world cement industry is developing in the following directions:
  Reducing the fuel cost and $CO_2$ emissions in the air,
  Improving the construction and technical properties of Portland cement.

Most cement enterprises in the world work using the dry process with preliminary decarbonization. However, when producing such large volume of cement, even the advanced technology requires burning over 300 million tons of fuel annually accompanied by emission of significant amounts of $CO_2$ attaining about 850 kg per ton of clinker and reaching nearly 2.5 billion tons annually, or over 50 billion cubic meters as a gas.

Improving the construction and technical properties of Portland cement has stopped, and recent decades are marked by poor progress in improvement of their strength remaining at the level of 42.5-52.5. Today, cement plants produce almost the same product all over the world, the quality of which is dependent on class or grade, including a set of requirements for construction and technical properties; the main characteristic is the compressive and bending strength of tested concrete samples having hardened for 28 days with variations in curing period.

Yet, all over the world enterprises pass to higher grade concretes. New concrete was termed in the world building as High Performance Concrete (HPC). Construction and technical properties of such concretes significantly expanded the possibilities for builders in the construction of skyscrapers, bridges, tunnels, dams, mines and underwater structures, while the production of concrete with high and ultra-high performance characteristics led to the development of modified concrete mixtures: optimization of compositions, stricter requirements to quality of fillers, use of expensive chemical additives and microsilica.

The challenge of today's cement industry, for instance, in Russia is a very high cost of production due to the significant consumption of fuel and electricity per ton of cement. The average specific fuel consumption per ton of clinker in Russia in 2011 is among the highest in the world—198.2 kg, power consumption per ton of cement is 117 kW/h, when adding 8.3% of mineral supplements on average, and the average cost per ton of the product attained 2,600 rubles in 2011, excluding VAT and shipping costs. The share of energy-efficient dry process at cement plants in Russia rose to 20.3% by 2011. Yet, it is not high enough to compete successfully with foreign suppliers, who have worked with the dry process for a long time and used up to 30-35 wt % of power-saving mineral supplements.

The second problem many cement enterprises face a poor quality of produced cement due to the fact that plants—under deterioration of production equipment and poor state of raw materials quarries—are aimed at saving resources such as fuel that causes incomplete burning of both clinker and electricity, low fineness and thus poor quality of delivered cement (250-300 $m^2$/kg in Russia instead of the world's 350-450 $m^2$/kg). In Russia, the volume of energy-saving mineral additives added to cement under grinding does not increase and even decreases continuously: from 10.6% in 2007 to 8.3% in 2011. This is due to two factors: the first one is the need for transportation and drying of mineral additives (slag and ash), and the second one is too small penalties introduced by the Russian Government for those who produce hundreds of millions tons of slag and ash waste annually: steel plants and CHPPs continue covering hundreds of thousands hectares of land around with waste (the volume of slag and ash dumps in Russia has exceeded 80 billion tons).

The third key problem of the Russian cement industry is the need for growth in cement production.

According to the national development plan adopted by the Government of Russia last year, the approved STRATEGY 2020 is expected to increase the annual cement production from current 55.9 million tons to 97.2 million tons in 2020. Hence, to meet the approved plans for the construction of housing and roads in Russia, it is necessary to increase the cement production volume by 5 million tons every year. And this is needed under circumstances when raw material quarries of many existing plants are exhausted, equipment is deteriorated, and the construction of new cement plants requires the investment of 250-300 USD on average per newly produced ton of cement.

Fine grinding of cement with various inorganic and polymeric additives is interesting for many researches. There is a considerable number of technical solutions, similar to this statement, which imply the increase in surface of cement grains and mineral fillers to intensify their interaction with water serving as the reaction medium. However, all known solutions face a dramatic increase in water consumption of fine-ground materials that causes a lot of adverse events leading to the degradation of construction, technical and operational properties of such cement compositions with mineral and polymer additives.

There is also a method of manufacturing the low-water binding material having two stages: the first stage is grinding the initial mixture of Portland cement clinker, gypsum and a portion of mineral additive to a specific surface area of 250-350 $m^2$/kg, while the second stage is additional grinding of the resulting material with plasticizer, setting retarders and remaining mineral additive to a specific surface area of 450-600 $m^2$/kg (see, for instance, Invention Certificate of the USSR No. 1 658 584, cl. C 04 B 7/52, 1988). This method makes it possible to reduce the energy consumption during grinding the binding material while maintaining its strength. Yet, the complexity of two-stage grinding and multicomponent composition of cement do not provide the consistent product quality by analog.

The prototype of the proposed method is a technique related to the production of cement with a mineral additive involving grinding to a specific surface of 400-600 $m^2$/kg of a mixture comprising Portland cement clinker, gypsum, superplasticizer S-3 and siliceous mineral supplement taken in an amount of 5-28 wt % of said components, followed by the addition of silica additive in an amount of 30-70% of cement weight, and final grinding of the mixture to a specific surface of 300-390 m$^2$/kg.

In this case, fine quartz sand, silica clay, blast furnace slag, and CHPP ash are used as siliceous additives. The disadvantage of this method is the need to implement a two-stage cement grinding and a relatively low bending strength of cement stone with a specific surface area of 300-390 m$^2$/kg.

To date, variable compositions of fine cements, including low-water binding materials, have not found any widespread use in the cement industry in Russia and other countries. Both foreign and Russian researchers are making attempts to get more active cements for high-strength concrete.

For instance, there is a hyperfine composition of Nanodur CEM II/B-S 52.2 R cement developed by Dyckerhoff (Germany) and obtained from Portland cement clinker and granulated blast furnace slag without adding microsilica. This is high-quality cement with special properties that meets the requirements for strength generation and resistance to aggressive environments. Yet, this cement requires significant expenditures (over 600 kg per cubic meter of concrete) and special additives to obtain concrete.

There are also compositions of cements and low-water binding materials developed in Russia and comprising finely ground Portland cement clinker, calcium sulfate varieties, mineral and polymer additives.

The prototype of the claimed cement composition is a composition comprising Portland cement clinker (9-97 wt %), calcium sulphate varieties (2-7 wt %), organic dewatering agent (0.085-4.0 wt %), active mineral additives and/or fillers in an amount of 5-65% of cement weight, and hardening accelerator at the cement/accelerator ratio from 1000:1 to 100:1 ground to a specific surface of 400-700 m$^2$/kg. In this case, Portland cement clinker contains particles of four fractions with the following sizes: fraction I—from 0.05 to 10.0 μm in an amount of 15.3-34.3 wt %; fraction II—from 10.01 to 30.0 μm in an amount of 37.2-77.4 wt %; fraction III—from 30.01 to 80.00 μm in an amount of 4.4-19.6 wt %; and fraction IV—over 80 μm in an amount of 0.1-4.8 wt %. Gypsum contains particles of one fraction ranging in size from 0.5 to 15 μm depleted in organic dewatering agent, while organic dewatering agent occurs in these cement fractions in the following amount: in fraction I—from 0.045 to 1.7 wt %, in fraction II—from 0.02 to 2.10 wt %, and in fraction III—from 0.01 to 0.2 wt %. Furthermore, dewatering agent is present as a separate fraction with a particle size of 0.3-20.0 μm in an amount of 0.01-0.2 wt %.

The analysis of the cement particle size distribution is indicative of the fact that it is not practicable in terms of cement production due to lack of capacity to regulate the particle size when grinding cement clinker in the declared range; the protected distribution of dewatering agents on cement particles and in a free form in all kinds of existing industrial grinding equipment is also hardly possible. To date, no cement plant has produced such cements.

SUMMARY

The objective of this invention is to improve the construction and technical properties of cement and reducing its cost at the addition of 70 wt % of mineral additives with the corresponding 1.2-2 reduction of fuel cost, emission of $NO_x$, $SO_2$ and $CO_2$ per ton of cement.

This objective is achieved through producing nanocement with the help of mechanochemical activation of dispersed grains of Portland cement in the presence of polymer modifier containing at least 60 wt % of sodium naphthalenesulfonate, mineral siliceous additive containing at least 30 wt % $SiO_2$, and gypsum stone to form continuous nanoshells, i.e., capsules of 20-100 nm in thickness on Portland cement grains comprising sodium naphthalenesulfonate structured by calcium cations; in this case, the mechanochemical activation of Portland cement is accompanied by material grinding to specific surface area of 300-900 m$^2$/kg in a ball mill with the following ratio of initial components, wt %:

| | |
|---|---|
| Portland cement or Portland Cement clinker | 30.0-90.0 |
| Gypsum stone | 0.3-6.0 |
| Specified polymer modifier | 0.6-2.0 |
| Specified siliceous additive | Balance. |

The set objective is also achieved by the method stated in para. 1 making it possible to prepare nanocement.

The term "nanocement" is used by the author in accordance with the Testing Protocol No. MTs 115/1/44 (PEM), LLC MC Rosnano identified nanoshells of 30-100 nm in size on the surface of modified Portland cement particles and referred such cements to nanoproducts of B category according to the Decree of the Government of the Russian Federation No. 1192-R dated Jul. 7, 2011.

The proposed method makes it possible to create a new dispersive composite material—nanocement with construction and technical properties that are evidently superior to those of known ordinary Portland cement. Nanocement production parameters, composition and morphology described in the claimed technical solution make it possible to achieve the set objectives. If the process parameters are not observed, the objective is not achieved.

The essence of the claimed technical solution lies in the fact that the mechanochemical activation of Portland cement dispersed grains in the presence of a polymeric modifier containing at least 60 wt % of sodium naphthalenesulfonate and mineral silica additive with at least 30 wt % $SiO_2$ provides for the formation of continuous nanoshells—capsules of sodium naphthalenesulfonate structured by calcium cations—on Portland cement grains that makes it possible to intensify grinding, to prevent from material aggregation, to improve the cement fineness, and to obtain a brand new dispersive composite binding material, so-called nanocement, with outstanding construction and technical properties, which is superior in its main indicators—hardening rate, compressive and bending strength—relative to those of Portland cement.

The formation of a new dispersive composite material—nanocement—is confirmed by the electron microscopic study of material samples using the JEOL JEM-2100 electron transmission microscope. The nanocement structure is demonstrated in representative electron microscopic images in FIGS. 1-5 with definitions of the inventor:

BRIEF DESCRIPTION OF THE FIGURES

*here and further figures with the word "nanocement" correspond to the content of Portland cement, wt % in nanocement FIG. 4A XRD pattern of quartz grain with a diameter of 103 nm given in FIG. 3, sample—"nanocement 75";

FIG. 4B fine particle of Portland cement (80 nm) capsulated with a continuous nanoshell of 10 nm in thickness, sample—"nanocement 90";

DETAILED DESCRIPTION

Considerable experimental data obtained by the inventor in the course of research and testing and given in various works made it possible to prove the formation of nanoshells on the surface of particles during mechanical activation of Portland cement in the course of grinding due to grafting and changes in composition and structure of modifier particles; this process involves the interaction of functional groups of the polymeric substance with calcium and oxygen active sites on the surface of clinker particles, enrichment in calcium cations and formation of structured continuous nanoshell with the following probable composition:

$$C_{10}H_7SO_3CaNa$$

The advanced research methods made it possible to identify nanoshells in nanocements in the course of experiments (FIGS. 2-5). Optimum properties of nanocements are achieved when thickness of a formed nanocement nanocapsule attains 30-60 nm uniformly on all clinker grains. Nanoshell thickness determined in the course of experiments is in good agreement with a value calculated by the ratio between shell thickness (d), proportion of polymer modifier in the whole system (a), and specific surface area of the dispersive system ($S_{sp}$)

$d=a/D \cdot S_{sp}$, where $D$ is density of polymeric modifier

The obtained electron microscopic images of nanocements (FIGS. 2-5) demonstrate the regular covering of cement grains with lighter nano sized shell of structured polymeric substance.

More transparent rim-shell with a thickness of 30-100 nm identified on nanocement grains in the course of electron microscopic studies refers to a substance with significantly lower density than clinker minerals and glass phase with a density of about 3 g/cm³. This is a structured polymeric modifier with a density of about 1 g/cm³. Some micro particles of about 100 nm in size observed with an electron microscope (FIG. 3) are quartz sand particles added to studied "nanocement 90" in the amount of 10 wt %; the structured polymeric modifier nanoshell is not able to be fixed there due to the lack of domains with a positive charge on quartz grain surface. Considerably higher construction and technical properties of nanocements are explained by the formation of nanoshells on cement grains in the course of modification by mechanochemical treatment in the presence of sodium naphthalenesulfonate. Hence, this invention makes it possible to create a new dispersive composite material by the mechanochemical activation and nano-encapsulation of ordinary Portland cement grains modified into nanocement, i.e., cement characterized by the presence of a continuous nano sized structured polymer shell with a thickness of several tens of nanometers in grains.

Nanocement is produced in the following way. Portland cement is subject to grinding in a ball mill (for 20-60 minutes) in the presence of a polymeric modifier containing sodium naphthalenesulfonate in the amount of at least 60 wt % of the polymeric modifier, siliceous mineral supplement with at least 30 wt % $SiO_2$, and gypsum stone, to a specific surface of 300-900 m²/kg.

This method makes it possible to provide both energy-efficient grinding and deep mechanochemical activation of components in the mixture to form a polymeric nanoshell of 20-100 nm in thickness structured by calcium cations on Portland cement grains.

To create the proposed technical solution, natural raw materials can be used as siliceous additives, for instance, quartz sand and rocks, as well as industrial waste such as slag, ash, tailings of various ores, etc., i.e., materials containing at least 30 wt % $SiO_2$. As for the polymeric modifier used in the proposed nanocement composition, today the industry of Russia and other countries produces a wide range of additives containing sodium naphthalenesulfonate in different amounts. For instance, products of OJSC Polyplast supplying additives such as Polyplast SP-1, Polyplast Lux, Polyplast Premium, Polyplast SP-4, Superplast PM, etc. to the market. Such additives also include Mighty plasticizer manufactured in Japan and FDN plasticizers manufactured in China. To achieve objectives of the proposed invention, it is necessary to use polymeric additives containing at least 60 wt % of sodium naphthalenesulfonate.

Exemplary production of the claimed nanocement is demonstrated through two series of industrial production and testing of nanocements using equipment with different performance:

Testing Series I, Examples 1-6

Production is 5 tons/hour (t/h) with a ball mill of 1.8×7.2 m in size using M 500 D0 Portland cement having a quantity from 30 to 90 wt % of the total composition (Table 1) produced by the Stary Oskol Plant, S-3 polymeric modifier (OJSC Polyplast) containing 69 wt % of sodium naphthalenesulfonate, addition of modifier in the amount of 1.0-2.0 wt % along with variable amount of natural gypsum stone from 0.3 to 1.0 wt %, and also addition of quartz sand from the Ramenskoe deposit (Moscow Region) containing 94 wt % $SiO_2$ providing the balance of the weight percentage.

Testing Series II, Examples 7-9

Production is 50 t/h with a ball mill of 2.9×11 m in size using Portland cement clinker, addition of FDN-05 polymeric modifier (China) containing 67 wt % of sodium naphthalenesulfonate, from 0.6 to 1.0 wt %, addition of 5-6 wt % gypsum stone, and also different amounts of slag, lava stone, slate and building sand (Tables 3-9).

Series I

Examples 1-6

Example 1

Portland cement, silica sand, polymeric modifier and gypsum were charged to a ball mill in proportions given in Table 1 to produce "nanocement 90". The material mixture was kept in a mill for 30-40 min. Discharging was followed by estimation of specific surface area and thickness of nanoshells. Construction and technical properties of "nanocement 90" are given in Table 2 along with data on fuel cost and $CO_2$ emissions.

Examples 2-6

Production of Other Nanocements

Nanocement 75, nanocement 55, nanocement 45, nanocement 35, and nanocement 30 were produced by example 1 by changing in each case the ratio of components in the mixture pursuant to Table 1. To estimate physicomechanical properties, nanocements were tested in the following way:

1. Normal consistency, setting time, specific surface, and soundness were determined pursuant to GOST 30744-2001 Cements. Testing using multifractional sand (harmonized with EM 196) without any changes.

2. Strength characteristics (in particular, cement compression strength class) were determined pursuant to GOST 30744-2001 Cements.

Testing using multifractional sand (harmonized with EN 196) with the following change: amount of mixing water was selected by cone flow on a shaking table (Hagerman's table) by DIN EN 015-3. In this case, a cone flow value should be 140-160 mm. If the upper value of cone flow exceeds the specified one, the water weight fraction in the solution is decreased, and if it is less than the lower value, then the water weight fraction in the solution is increased. The selection of water and cement ratio was followed by the formation of samples, so-called bars, by GOST 30744-2001 without changes.

The certification testing of nanocements by existing GOST standards proves their full compliance with requirements of TU-5733-067-66331738-2012 Civil Construction Nanocement. Technical Provisions. Nanocements, keeping the standard setting time, are different from standard Portland cement in larger surface area, while preserving the soundness, and in significantly lower values of normal consistency of cement paste (17-20% on average instead of 26-27% for standard Portland cement). At such a low water demand the sand-cement mixtures are characterized by very high mobility (cone flow of all nanocement compositions is 145-153 mm against 115 mm of initial Portland cement, Table 2). As to basic indicators: in hardening rate, compressive and bending strength all nanocement compositions are superior to initial typical Portland cement M 500 D0 in construction and technical properties making it possible to upgrade the cement class to K 72.5-K 82.5.

Intensive strength generation of cement stone based on nanocements in the initial period of hardening under normal conditions is particularly important. For instance, nanocement 55 containing only 55 wt % of modified Portland cement demonstrated compressive strength of 49.3 MPa and bending strength of 6.3 MPa after 2 days of hardening, as well as compressive strength of 77.5 MPa and bending strength of 8.2 MPa after 28 days of hardening. The described nanocement composition is superior in its construction and technical properties to the prototype with similar composition shown compressive strength of 61.4 MPa and bending strength of 6.7 MPa (Table 2).

The low-clinker nanocement technology developed for the first time in the world makes it possible to decrease drastically, in 1.5-2 times, the fuel cost and $CO_2$ emission per ton of cement owing to reducing the amount of Portland cement clinker in such low-clinker cements to 30 wt % while maintaining construction and technical properties of plain cement (Table 2).

TABLE 1

Composition of mixtures to produce nanocements (Testing series I, examples 1-6)

| Example No. | Mixture composition, wt % | | | | Specific surface, $m^2$/kg | Nanoshell thickness, nm |
| --- | --- | --- | --- | --- | --- | --- |
| | Portland cement | Quartz sand | Super plasticizer S-3 | Gypsum stone | | |
| 1 | 90 | 7 | 2.0 | 1.0 | 519 | 30-120 |
| 2 | 75 | 22.5 | 1.7 | 0.8 | 521 | 30-115 |
| 3 | 55 | 42.8 | 1.6 | 0.6 | 527 | 15-100 |
| 4 | 45 | 53.2 | 1.4 | 0.4 | 530 | 18-95 |
| 5 | 35 | 63.5 | 1.2 | 0.3 | 537 | 15-100 |
| 6 | 30 | 68.7 | 1.0 | 0.3 | 530 | 14-85 |

Testing Series II (Examples 7-9)

Figure 1:
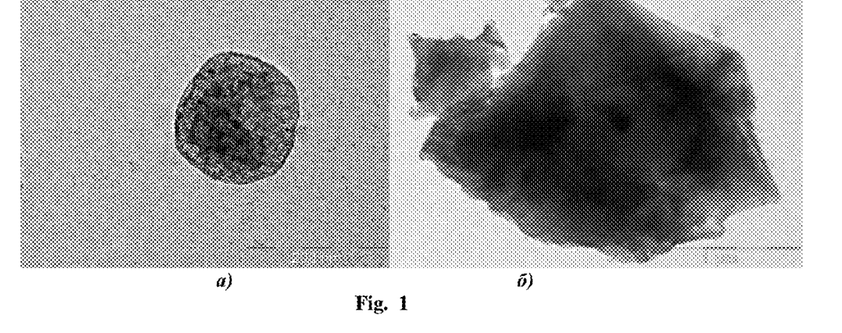
FIG. 1A Grains of ordinary Portland cement: rounded fine particles
FIG. 1B. Grains of ordinary Portland cement: larger angular particles (b)
Figure 2:
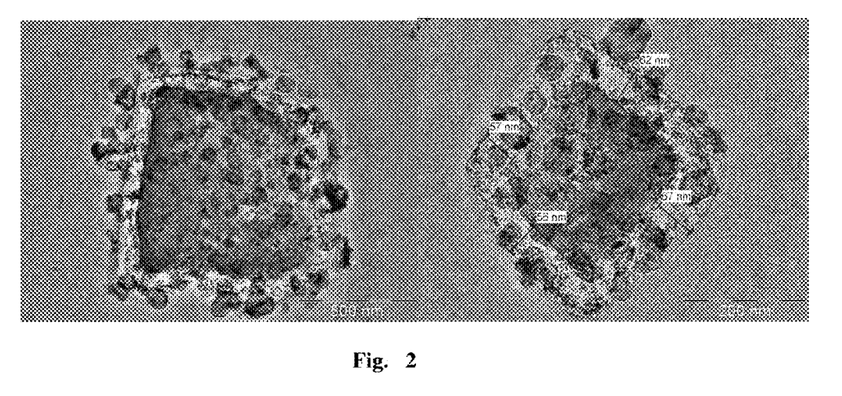
FIG. 2 electron microscopic images of capsule Portland cement grains with nanoshells. Nanoshell thickness is given at the right image. Scale is given in images. Sample—"nanocement 75*"
Figure 3:
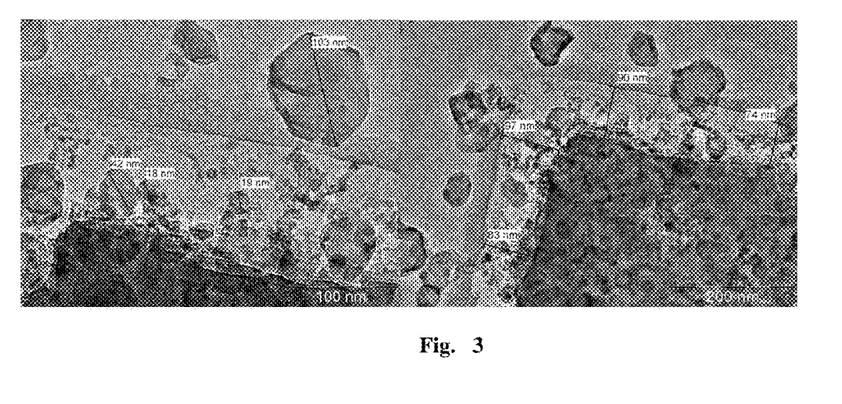
FIG. 3 structured modifier nanoshells on Portland cement grains. Nanoshell thickness is given in nm. Electron microscopic images. Scale is given in images. Fine particles without nanoshells are Quartz sand grains occurring outside nanocement grains. Sample—"nanocement 75".
Figure 4:
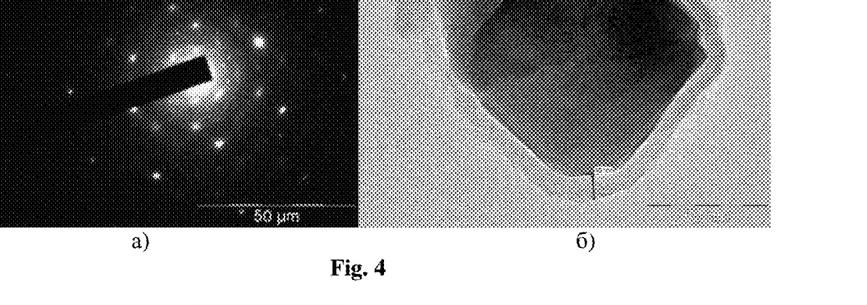
Figure 5:
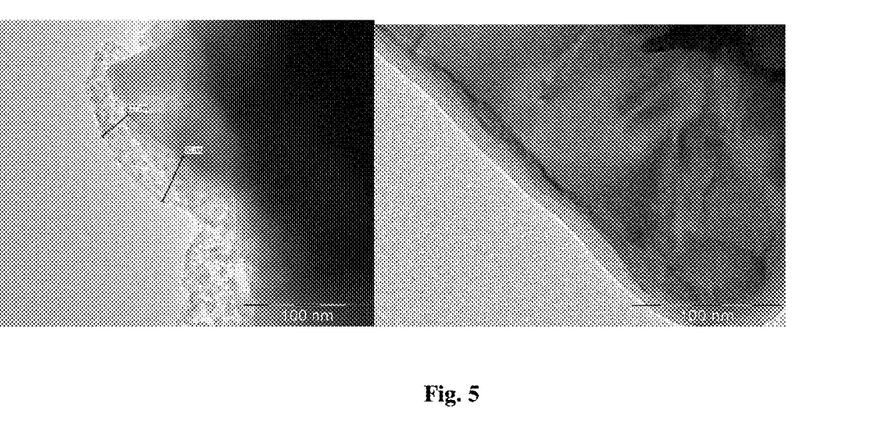
FIG. 5 large particles of Portland cement capsulated by modifier structured nanoshell. Grain boundaries. Scale is given in images, sample—"nanocement 90"
Figure 6:
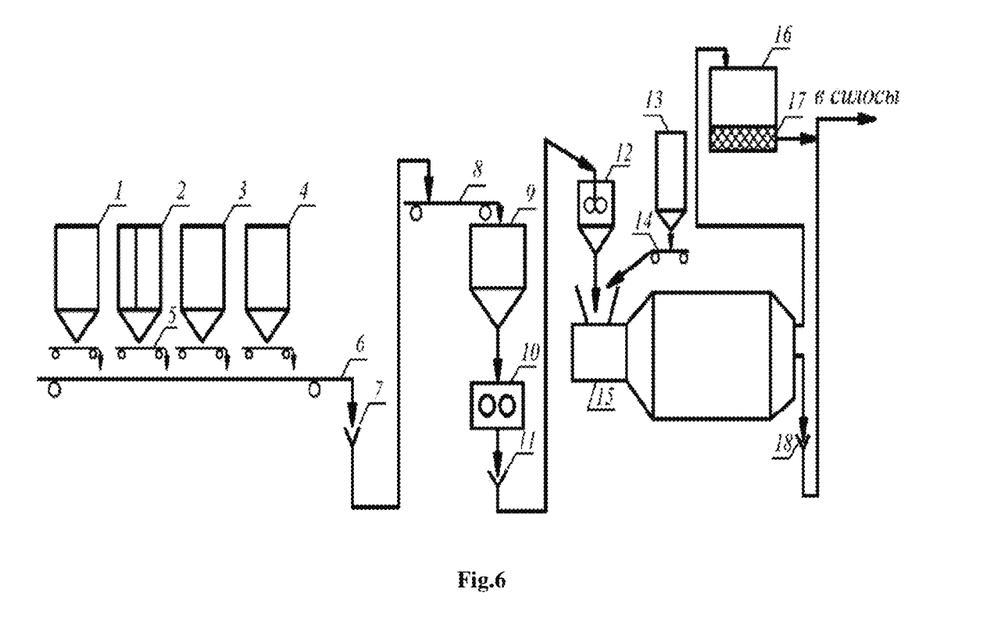
FIG. 6 Provides a view of an embodiment of a production line for manufacturing nanocement of the present invention.

The second series of industrial testing of nanocement manufactured according to the proposed invention was carried out with the use of the production line with a performance of 50 t/h (FIG. 6). The line included: 1—coal slag hopper; 2—hopper set of gypsum and volcanic rock; 3—slate hopper; 4—clinker hopper, 5—weighing hoppers, 6, 8—belt conveyors;

TABLE 2

NANOCEMENT CHARACTERISTICS (testing series I, examples 1-6)

| No. | Example No. | Normal consistency of cement paste, % | Setting time, h-min | | Cone flow, mm | Strength of normal-cured samples, MPa | | | | | | Specific indicator per ton of cement, kg | |
| --- | --- | --- | --- | --- | --- | --- | --- | --- | --- | --- | --- | --- | --- |
| | | | | | | After 2 days | | After 7 days | | After 28 days | | Fuel consumption** per ton of cement | $CO_2$ emission per ton of cement |
| | | | Start | End | | Under bending | Under compression | Under bending | Under compression | Under bending | Under compression | | |
| 1 | NANOCEMENT 90* | 19.0 | 0-40 | 2-45 | 145 | 7.1 | 53.8 | 8.0 | 72.6 | 8.7 | 82.7 | 180 | 960 |
| 2 | NANOCEMENT 75 | 18.0 | 0-45 | 2-40 | 145 | 6.9 | 54.7 | 8.0 | 68.5 | 8.5 | 77.8 | 150 | 802 |
| 3 | NANOCEMENT 55 | 18.5 | 0-55 | 5-30 | 147 | 6.3 | 49.3 | 7.5 | 65.4 | 8.2 | 77.5 | 110 | 538 |
| 4 | NANOCEMENT 45 | 17.0 | 1-45 | 3-50 | 148 | 4.8 | 39.9 | 6.7 | 57.4 | 7.9 | 68.1 | 90 | 481 |

TABLE 2-continued

NANOCEMENT CHARACTERISTICS (testing series I, examples 1-6)

| No. | Example No. | Normal consistency of cement paste, % | Setting time, h-min Start | Setting time, h-min End | Cone flow, mm | Strength of normal-cured samples, MPa After 2 days Under bending | After 2 days Under compression | After 7 days Under bending | After 7 days Under compression | After 28 days Under bending | After 28 days Under compression | Specific indicator per ton of cement, kg Fuel consumption** per ton of cement | $CO_2$ emission per ton of cement |
|---|---|---|---|---|---|---|---|---|---|---|---|---|---|
| 5 | NANO-CEMENT 35 | 17.0 | 2-35 | 5-40 | 153 | 3.9 | 30.7 | 5.8 | 46.6 | 7.2 | 61.4 | 70 | 374 |
| 6 | NANO-CEMENT 30 | 19.0 | 2-15 | 5-40 | 153 | 3.0 | 20.4 | | 46.4 | 7.6 | 52.1 | 60 | 321 |
| — | Initial Portland cement 500 DO-N | 26.7 | 2-15 | 3-50 | 115 | 2.9 | 21.3 | — | — | 6.4 | 54.4 | 200 | 1,070 |
| — | PORTLAND CEMENT by prototype | 23.0 | 1-30 | 3-10 | 139 | 3.2 | 28.7 | 5.4 | 43.1 | 6.7 | 61.4 | 110 | 588 |

*From now on, figure is amount of Portland cement in nanocement; the rest is fine-ground quartz sand
**To simplify the calculation, materials of mineral additives are considered to be dry; wet production for basic cement 7,11,18—chain elevators; 9—feed hopper; 10—rolling crusher; 12—feed hopper with a mixer to homogenize the mixture; 13—feed hopper of polymeric modifier; 14—belt doser; 15—ball mill; 16—hose filter; 17—feed screw.

A rolling crusher of U5TM-2003 type is installed in the production line as an ancillary equipment, its production capacity attains up to 150 t/h, drive power is 400 kW; a three-chamber tube ball mill of 2.9×11 m in size is installed as a major grinding equipment, its production capacity is 50 t/h, drive power is 1,200 kW, and drum speed is 19.0 rpm. All mixture components, including Portland cement clinker and mineral additives as pieces (max 300 mm in diameter) are supplied to the grinding equipment (press rollers) without preliminary drying up. The gap between the rollers is about 40 mm. Dry FDN-05 polymeric modifier manufactured in China (content of sodium naphthalenesulfonate is 67 wt %) is added to the initial mixture after preliminary grinding of components with press rollers to a size of 0÷25 mm and homogenizing the mixture in a mixer by forced mixing.

Mixtures containing the following components were accepted in the course of testing the technological line: Portland cement clinker, volcanic stone, coal slag, construction sand, gypsum and FDN-05 polymeric modifier. Table 3 demonstrates chemical composition of initial raw components, while Table 4 shows the composition of mixtures used to produce nanocement according to examples 7-9.

Polymeric modifier in examples 7-9 was added uniformly and proportionally during 1 h 40 min. 11 samples were taken from each example. The first sample was taken 20 minutes after the beginning of material supply, while the following samples were taken every 15 minutes. The mill production capacity was set by supply of cement components and attained an ordinary routine norm of 50 t/h.

According to the testing results, after preliminary grinding with press rollers, 60-79 wt % of material is already powder, 15-20 wt % is observed as cement grit of 5-7 mm in size, while a small portion of material (10-15 wt %) occurs in a mill as particles of 15-25 mm in size.

TABLE 3

Chemical composition of initial components for preparing nanocement

| No. | Oxide | Clinker | Construction sand | Coal slag | Slate | Gypsum stone | Volcanic rock |
|---|---|---|---|---|---|---|---|
| 1 | Ignition loss | 0.65 | 0.62 | 6.63 | 8.3 | 14.18 | 6.58 |
| 2 | $SiO_2$ | 21.77 | 75.14 | 55.12 | 55.35 | 10.67 | 70.42 |
| 3 | $Al_2O_3$ | 5.04 | 7.32 | 9.35 | 9.8 | 0.48 | 13.98 |
| 4 | $Fe_2O_3$ | 3.46 | 3.26 | 16.45 | 15.7 | 1.1 | 1.05 |
| 5 | CaO | 65.15 | 7.74 | 6.2 | 7.8 | 31.45 | 3.35 |
| 6 | MgO | 1.56 | 3.68 | 1.81 | 1.78 | 0.42 | 0.72 |
| 7 | $SO_3$ | 0.96 | 0.43 | 1.02 | 0.56 | 41.29 | 0.44 |
| 8 | W (wetness) | 0.10 | 0.20 | 3.44 | 0.71 | 0.41 | 3.04 |

Such material is intensively crushed already in the first mill chamber, and total specific energy consumption (with account for press rollers and ball mill) attains 30-35 kWh/t of cement that is significantly less than energy consumption needed to produce a prototype of the proposed invention reaching 50-60 kWh/t of cement. The testing made it possible to find out the significant influence of FDN-05 polymeric modifier on grinding of cement with mineral additives: the modifier intensifies milling and significantly improves the cement fineness owing to nano-encapsulation of fine cement grains and prevention from their aggregation thus providing very high specific surfaces of nanocements (Table 5).

TABLE 4

Compositions of initial mixtures to produce nanocement by examples 7-9

| Composition No. | Initial components of mixture | Content, wt % Example 7 | Example 8 | Example 9 |
|---|---|---|---|---|
| 1 | Clinker | 63.0 | 40.0 | 33.0 |
| 2 | Volcanic stone | 6.0 | 18.0 | 28.0 |
| 3 | Mixture of slag and construction sand | 10.0* | 15.2* | 21.4** |

TABLE 4-continued

Compositions of initial mixtures to
produce nanocement by examples 7-9

| Composition No. | Initial components of mixture | Content, wt % | | |
|---|---|---|---|---|
| | | Example 7 | Example 8 | Example 9 |
| 4 | Slate | 14.0 | 21.0 | 12.0 |
| 5 | Gypsum stone | 6.0 | 5.0 | 5.0 |
| 6 | FDN-0.5 polymeric modifier | 1.0 | 0.8 | 0.6 |

*The slag/sand ratio is 3:2;
**The slag/sand ratio is 5:2.

Thus, at a fixed grinding line performance of 50 m/h the cement fineness improves significantly with the addition of additives in the amount of 0.5-1 wt % of cement and the increase in amount of supplied volcanic stone.

According to the analysis of data obtained by the fractionation of individual samples of produced nanocements in the course of the testing series I by example 7 with 1 wt % of polymeric modifier, the appearance of this material in the mill causes the shift in the range of cement particle size distribution to the region of more dispersed values, i.e., the improvement in the mill grinding ability (Table 6).

TABLE 5

Specific surface area and average particle size of
nanocement samples with different mineral additives

| Sample * | S, m²/kg | D, μm |
|---|---|---|
| 1-3 | 548 | 4.13 |
| 1-6 | 556 | 4.07 |
| 1-9 | 518 | 4.37 |
| 2-3 | 730 | 3.10 |
| 2-6 | 783 | 2.89 |
| 2-9 | 691 | 3.27 |
| 3-3 | 792 | 2.86 |
| 3-6 | 936 | 2.42 |
| 3-9 | 771 | 2.93 |

TABLE 5-continued

Specific surface area and average particle size of
nanocement samples with different mineral additives

| Sample * | S, m²/kg | D, μm |
|---|---|---|
| General purpose cement (without modifier) | 462 | 6.60 |

* From now on, sample designations are as follows: the first figure is composition number, while the second figure is sample number According to the testing results, the occurrence of polymeric modifier contributes to finer grinding of cement with mineral additives, largely due to grinding particles of 30-80 μm in size (Table 5, FIG. 7).

Figure 7:
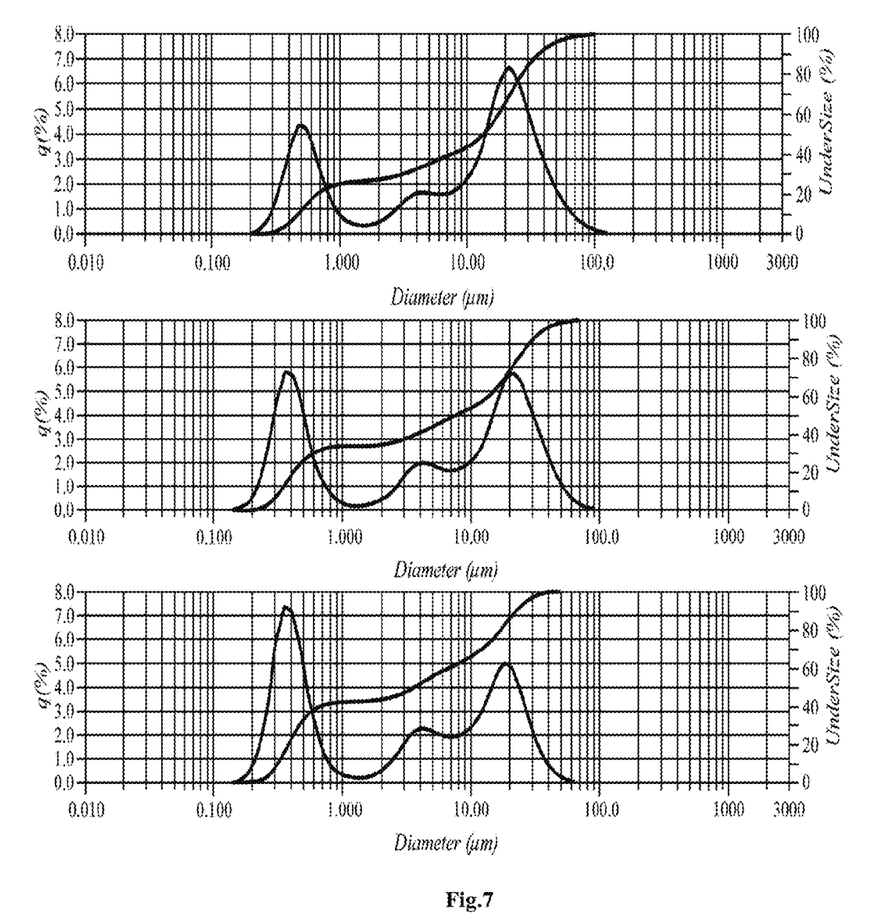
FIG. 7 Provides the curves of nanocement particle size with mineral additives.

FIG. 7 shows the curves of nanocement particle size with mineral additives: example 7-1—nanocement contains 63 wt % of Portland cement clinker and 1.0 wt % of polymeric modifier; example 8-2—nanocement contains 40 wt % of Portland cement clinker and 0.8 wt % of polymeric modifier; and example 9-3—nanocement contains 33 wt % of Portland cement clinker and 0.6 wt % polymeric modifier.

According to the testing results, the occurrence of polymeric modifier contributes to finer grinding of cement with mineral additives, largely due to grinding particles of 30-80 μm in size (Table 5, FIG. 7).

The analysis of the data on cement particle size distribution (Table 6) and, in particular, curves in FIG. 7 is indicative of the fact that cement fineness improves significantly as the volcanic rock content increases. Bulk density grows with increase in modifier concentration in the mill and with increase in the supply period due to reducing the porosity index and improvement in dispersion of cement particles.

Water demand and setting time of cement paste in selected samples of obtained nanocements depend on both the clinker content and the modifier concentration (Table 8).

Strength characteristics of the samples made of cement-sand mixtures depend on the clinker content, polymeric modifier concentration in cement, and water-cement ratio (Table 9).

The obtained performance characteristics of nanocements are the best in the cement industry history.

TABLE 6

Dispersion and particle size* of production lots of nanocement samples (Testing series II)

| | | Fraction content, wt % | | | | | |
|---|---|---|---|---|---|---|---|
| | | Sample 3 | | Sample 6 | | Sample 9 | |
| Example No. | Particle size distribution (range), μm | Absolute content of particles | Total content of particles | Absolute content of particles | Total content of particles | Absolute content of particles | Total content of particles |
| Example 7 | 0-1.0 | — | 25.03 | 16.084 | 16.084 | — | 14.627 |
| | 1.0-5.0 | 10.61 | 35.632 | 17.44 | 33.523 | 18.22 | 32.846 |
| | 5.0-10.0 | 8.62 | 44.247 | 8.44 | 41.965 | 7.35 | 40.198 |
| | 10.0-20.0 | 21.21 | 65.458 | 19.88 | 61.842 | 18.58 | 58.782 |
| | 20.0-30.0 | 18.36 | 83.814 | 19.22 | 81.064 | 19.28 | 78.066 |
| | 30.0-40.0 | 7.91 | 91.723 | 9.36 | 90.328 | 9.91 | 87.98 |
| | 40.0-60.0 | 5.95 | 97.675 | 7.20 | 97.528 | 8.48 | 96.457 |
| | 60.0-70.0 | 1.57 | 99.243 | 2.47 | 100.0 | 1.94 | 98.4 |
| | 70.0-80.0 | 0.39 | 99.633 | — | — | 0.41 | 98.806 |
| Example 8 | 0-1.0 | — | 41.084 | — | 37.694 | — | 33.936 |
| | 1.0-5.0 | 11.0 | 52.084 | 12.05 | 49.744 | 11.34 | 45.275 |
| | 5.0-10.0 | 8.13 | 60.213 | 8.86 | 58.601 | 8.90 | 54.176 |
| | 10.0-20.0 | 16.84 | 77.056 | 18.234 | 76.835 | 19.02 | 73.194 |
| | 20.0-30.0 | 13.49 | 90.543 | 14.37 | 91.201 | 15.74 | 88.932 |
| | 30.0-40.0 | 5.26 | 95.801 | 5.35 | 96.555 | 6.39 | 95.323 |
| | 40.0-60.0 | 3.35 | 99.155 | 2.99 | 99.540 | 3.93 | 99.256 |

TABLE 6-continued

Dispersion and particle size* of production lots of nanocement samples (Testing series II)

| | | Fraction content, wt % | | | | | |
|---|---|---|---|---|---|---|---|
| | | Sample 3 | | Sample 6 | | Sample 9 | |
| Example No. | Particle size distribution (range), μm | Absolute content of particles | Total content of particles | Absolute content of particles | Total content of particles | Absolute content of particles | Total content of particles |
| | 60.0-70.0 | 0.48 | 99.630 | 0.306 | 99.843 | 0.42 | 99.677 |
| | 70.0-80.0 | 0.70 | 99.852 | 0.16 | 100.0 | 0.22 | 99.897 |
| Example 9 | 0-1.0 | — | 33.498 | — | 42.47 | — | 25.860 |
| | 1.0-5.0 | 11.55 | 45.043 | 10.98 | 53.454 | 13.04 | 38.901 |
| | 5.0-10.0 | 9.85 | 54.892 | 12.35 | 65.802 | 9.42 | 48.318 |
| | 10.0-20.0 | 20.675 | 75.567 | 18.93 | 84.733 | 19.85 | 68.171 |
| | 20.0-30.0 | 15.5 | 91.066 | 11.37 | 96.107 | 16.43 | 84.609 |
| | 30.0-40.0 | 5.49 | 96.556 | 2.83 | 98.94 | 7.24 | 91.842 |
| | 40.0-60.0 | 2.98 | 99.531 | 1.06 | 100.0 | 5.73 | 97.458 |
| | 60.0-70.0 | 0.307 | 99.838 | — | — | 0.97 | 98.536 |
| | 70.0-80.0 | 0.16 | 100.0 | — | — | 0.65 | 99.182 |

*Measurements are made with a LA-950 laser granulometer (HORIBA, Japan)

TABLE 7

Bulk density of nanocement (example 7)

| Sample No. | Sampling time*, min. | Bulk density, kg/m3 | Sample No. | Sampling time*, min. | Bulk density, kg/m3 | Notes |
|---|---|---|---|---|---|---|
| 1-1 | 20 | 925 | 1-7 | 110 | 1,010 | |
| 1-2 | 35 | 965 | 1-8 | 125 | 1,010 | |
| 1-3 | 50 | 970 | 1-9 | 140 | 1,010 | |
| 1-4 | 65 | 985 | 1-10 | 155 | 1,035 | Supply of polymeric modifier is stopped |
| 1-5 | 80 | 987 | 1-11 | 15 | 985 | After stopping the polymeric modifier supply |
| 1-6 | 95 | 996 | Cement produced without additives (general purpose cement) | 60 | 957 | After stopping the polymeric modifier supply |

*From the beginning of polymeric modifier supply

The obtained results demonstrate a significant effectiveness of the mechanochemical treatment technology for production of low-clinker nanocements, which makes it possible to reduce the clinker content to 30-40 wt % while providing a sufficiently high hydraulic activity of cement, despite the excess moisture of volcanic stone and coal slag. It is essential to note the high values of bending strength of cement-based stone with 33 wt % of clinker reaching 12-13 MPa and related to the increase in the content of finely dispersed volcanic stone in low-clinker cement (Table 9).

TABLE 8

Water demand and setting time of nanocement

| Sample No. | Water demand, % | Setting start | Setting end |
|---|---|---|---|
| Example 7 | | | |
| 1-2 | 19 | 1 h 05 min. | 2 h 05 min |
| 1-6 | 20 | 1 h 15 min | 2 h 15 min |
| 1-11 | 24 | 1 h 35 min | 3 h 05 min |
| Example 8 | | | |
| 2-2 | 20 | 2 h 25 min | 4 h 35 min |
| 2-6 | 20 | 3 h 15 min | 4 h 45 min |
| 2-11 | 26 | 3 h 10 min | 4 h 25 min |
| Example 9 | | | |
| 3-2 | 23 | 2 h 00 min | 4 h 13 min |
| 3-6 | 24 | 2 h 05 min | 4 h 15 min |
| 3-11 | 24 | 2 h 15 min | 4 h 25 min |

The studies of nanocements in concrete made it possible to determine the optimal type and amount of siliceous mineral additives of diverse origins for addition to nanocements provided that they contain at least 30 wt % $SiO_2$, sufficient to form a high-quality cement stone.

TABLE 9

Strength testing of normal-cured cement

| Number of samples in each composition | W/C | Compression strength 1 day | 3 days | 28 days | Bending strength 1 day | 3 days | 28 days |
|---|---|---|---|---|---|---|---|
| | | | | | | | |

Example 7: clinker content is 63 wt %, polymeric modifier content is 1.0 wt %

| | | | | | | | |
|---|---|---|---|---|---|---|---|
| 4 | 0.31 | 25.5 | 33.8 | 54.9 | 4.9 | 6.5 | 8.8 |
| 7 | 0.33 | 24.6 | 34.1 | 55.2 | 3.9 | 6.7 | 9.2 |
| 11 | 0.36 | 21.3 | 37.2 | 59.0 | 3.2 | 6.3 | 9.1 |
| Nanocement in plant silo | 0.27 | 33.1 | 49.4 | 66.7 | 7.1 | 8.4 | 10.9 |
| | 0.30 | 32.6 | 47.0 | 64.6 | 6.6 | 7.4 | 10.2 |
| | 0.33 | 26.8 | 43.6 | 58.6 | 7.4 | 7.5 | 9.8 |
| | 0.34 | 24.9 | 40.9 | 57.4 | 6.4 | 6.8 | 9.2 |

Example 8: clinker content is 40 wt %, polymeric modifier content is 0.8 wt %

| | | | | | | | |
|---|---|---|---|---|---|---|---|
| 4 | 0.31 | 18.7 | 26.8 | 41.7 | 3.4 | 5.1 | 7.1 |
| 7 | 0.33 | 17.6 | 24.5 | 40.2 | 3.2 | 4.7 | 7.0 |
| 11 | 0.35 | 15.2 | 25.2 | 40.2 | 3.2 | 4.6 | 7.0 |

Example 9: clinker content is 33 wt %, polymeric modifier content is 0.5 wt %

| | | | | | | | |
|---|---|---|---|---|---|---|---|
| 2 | 0.34 | 8.7 | H.2 | 35.3 | 2.1 | 2.7 | 13.2 |
| 2 | 0.35 | 5.9 | 7.0 | 32.3 | 1.8 | 2.8 | 12.9 |
| 3 | 0.36 | 7.2 | 5.1 | 30.6 | 1.8 | 3.3 | 12.7 |
| 7 | 0.36 | 7.8 | 6.1 | 30.2 | 2.0 | 2.7 | 13.4 |
| 7 | 0.42 | 6.9 | 5.8 | 28.1 | 2.0 | 2.9 | 12.9 |

INDUSTRIAL APPLICABILITY

Nanocements with record low cost of Portland cement (to 150 kg per cubic meter of concrete) make it possible to produce concrete with high strength, water and frost resistance (Table 10). In this case, the proved ability of nanocements to long-term storage without loss of activity is very important. The results of recent testing of fresh and one-year stored nanocements in concrete are given in Table 10.

TABLE 10

Properties of concrete made from nanocement after different periods of cement storage

| No. | Nanocement type | Strength of normal-cured concrete, MPa: in numerator, 2 months after cement manufacturing; in denominator, a year later, storage in bags | | | | Concrete characteristics | | |
|---|---|---|---|---|---|---|---|---|
| | | 3 days | | 28 days | | Average density, kg/m³ | Frost resistance, cycles | Water resistance |
| | | Under bending | Under compression | Under bending | Under compression | | | |
| 1 | Nanocement 40 | 4.2 | 40.2 | 5.4 | 66.2 | 2455 | >300 | W20 |
| | | | 40.9 | | 59.6 | 2465 | | |
| 2 | Nanocement 90 | 4.5 | 49.9 | 7.3 | 80.0 | 2475 | >300 | W20 |
| | | | 45.5 | | 67.9 | 2400 | | |

The estimated prime cost of nanocements shows considerable economic advantage of nanocement production, when the nanocement cost is reduced in proportion to the amount of added siliceous mineral supplement (Table 11).

TABLE 11

Economic efficiency of produced low-clinker nanocements of different classes based on the cost of Portland cement at the Voskresensky Cement Plant, Lafarge Group of Companies 2,154 rub/t (data of 2011)

| Raw materials | Unit cost, rub/t | Nanocement 30 (Classes 32.5-42.5) Portion | Rub | Nanocement 45 (Class 52.5) Portion | Rub | Nanocement 55 (Class 62.5) Portion | Rub |
|---|---|---|---|---|---|---|---|
| Portland cement | 2,154 | 0.30 | 646 | 0.45 | 970 | 0.55 | 1,185 |
| Granulated slag | 500 | 0.70 | 350 | 0.55 | 275 | 0.45 | 225 |
| Modifier | 38,000 | 0.01 | 380 | 0.011 | 418 | 0.012 | 456 |
| Total prime cost, rub | — | — | 1,376 | — | 1,663 | — | 1,866 |

Note:
Prime cost data are given for cement classes most commonly used in construction.

The results of application of nanocements and nanocement-based concretes are indicative of their great superiority over the Portland cement virtually in all indicators: hardening rate, grade strength, water resistance, frost resistance and durability at high economic efficiency of production and application.

The intensive strength generation of nanocement at the initial hardening period under normal conditions is of special importance. For instance, nanocement 55 comprising only 55 wt % of Portland cement is characterized by a compressive strength of 49.0 MPa and bending strength of 6.3 MPa after two days of normal hardening and by a compressive strength of 77.5 MPa and bending strength of 8.2 MPa after 28 days of hardening.

The role of finely ground siliceous mineral additives in nanocement is very important. As is known, the hardening Portland cement stone contains two main types of hydrated minerals: calcium hydrosilicates and calcium hydroxide. The ratio of hydrated phases of ordinary cement stone is as follows, wt %:
  calcium hydrosilicates—85,
  calcium hydroxide—15

It would seem that the calcium hydroxide content is not high, but its presence significantly reduces the cement construction and technical properties and strength due to a layered crystal morphology of calcium hydroxide such as portlandite, poorly connected layers of which commonly cause the fault in cement stone.

Construction sand forming along with cement and water the cement stone in ordinary concrete mixtures and currently used throughout the world is characterized by the occurrence of very large particles of silica and siliceous minerals: the size of most particles ranges from 300 to 1000 μm thus slowing down the formation of hydrosilicates on the surface of sand particles not exceeding 50-70 m², under the interaction of sand in the presence of water with much finer cement particles of 5-20 μm in size at average specific surface area of Portland cement attaining 300 m²/kg in Russia and 400 m²/kg abroad.

A simplified variant of the chemical reaction necessary for the formation of cement stone with data on the initial and final composition of reactants:

$$3CaO.SiO_2 + 3H_2O + SiO_2 = 2(CaO.SiO_2.H_2O) + Ca(OH)_2$$

In modern Portland cement-based concretes, chemical interaction between components in the cement-water-sand system takes a very long time (years). In spite of the fact that the sand/cement ratio typically attains 2:1, due to large particles of 400-600 μm in size with a very small reaction surface of chemically inert sand particles, 40-50 m²/kg, such interaction proceeds in underdeveloped areas of contact between quartz particles and cement grains with a dispersion of 10-20 μm.

That is why in many countries, scientists have come to the decision to improve the reactivity of a fine filler by adding microsilica, ground silica (as well as ash, slag, and pozzolanic rocks) to intensify the cement stone formation. Yet, to lay such mixtures, it is necessary to use very expensive chemical additives that reduce water consumption of cements with finely ground fillers while maintaining the sufficient mobility of concrete mixtures.

On the contrary, nanocements as well as their analogues—low-water binding materials, low-water cement, etc.—are distinguished by low water demand and, as a rule, do not require the application of any chemical additives owing to nanoshells in material grains. Nanocement-based concrete and mortar mixtures are characterized by high mobility and plasticity, making it possible to lay them efficiently.

In concrete based on low-clinker nanocements (the clinker content in nanocements, according to the proposed invention, can be reduced to 30 wt %), the reaction between cement particles and sand is repeatedly accelerated due to the fact that their dimensions are almost identical and attain from two to a few tens of microns at an average specific surface area of solid particles of about 500 m²/kg with a reduced amount of water in the system actively consumed by forming hydrosilicates.

In the developed low-clinker nanocements, the cement hydration is accompanied by the binding of calcium hydroxide as it is formed in the hardening cement paste into the main concrete product, such as a stronger and more durable calcium hydrosilicate, pursuant to the reaction:

$$Ca(OH)_2 + SiO_2 = CaO.SiO_2.H_2O$$

As follows from the investigation of low-clinker nanocement-based cement stone, as early as the initial period of hardening under normal conditions calcium hydroxide is actively bound into calcium hydrosilicate.

Thus, the calcium hydroxide content in cement stone based on ordinary Portland cement and low-clinker nanocements (compositions with 75, 55 and 45 wt % of clinker, respectively, and the rest is in the binding material such as quartz sand finely ground with cement) in different hardening periods under normal conditions is as follows, wt %:

| Binding material | 3 days | 7 days | 14 days | 28 days | 60 days |
|---|---|---|---|---|---|
| Portland cement | 3.2 | 5.5 | 6.4 | 7.1 | 8.2 |
| Nanocement - 75 | 1.5 | 2.5 | 3.0 | 2.7 | 2.4 |
| Nanocement - 55 | 0.8 | 1.1 | 1.6 | 1.5 | 1.3 |
| Nanocement - 45 | 0.5 | 0.9 | 1.4 | 1.2 | 1.0 |

Nanocement-based concretes are characterized by intensive growth in strength of cement stone even under record low cement amount in concrete mixture with simultaneous improvement of basic indexes of cement stone and concrete: strength, water and cold resistance. Low-clinker nanocements make it possible to use substandard raw materials to produce high-quality concrete, because strength and other properties are not dependent on specific features of coarse or fine filler grains, but by cement stone formed directly from low-clinker nanocement components: particles of cement proper with nanoshell and quartz sand particles of similar size.

High density of the nanocement-based cement stone ensures the tight contact zone at the boundary of stone with grains of coarse and fine fillers and steel reinforcement structures and explains the highest water resistance of this stone almost independent of mass exchange with the environment that contributes to its durability.

Perfect construction and technical properties of nanocements make it possible to apply them as the universal cement: general purpose cement, readily hardening cement, cement for road and hydraulic engineering, sulphate resistant cement, straining and expanding cements, decorative cement, oil well cement and cement for low temperatures, for asbestos-cement products, for dry construction and repair mixtures, for highly penetrating cementing solutions, for improvement of grounds and foundations, etc.

Nanocements are used to produce widely applicable concretes of B40 class, as well as high- and super-strong concretes of B100 class and over, a wide range of reinforced concrete products without curing, and also quick-hardening, water resistant, salt resistant, durable and other concretes needed for present-day common and special construction.

The implementation of low-clinker nanocements provides with the following opportunities:
- to reduce the specific fuel consumption per ton of produced cement by 40-60 kg;
- to improve the cement quality and cement cost by 25-30%;
- to increase (if needed) the production at any cement plant in 1.5-1.7 times without the construction of clinker burning areas, only by the development of grinding zones;
- to create compact production lines for the modification of Portland cement clinker or cement into low-clinker nanocements at concrete plants;
- to reduce emissions of heat, $NO_x$, $SO_2$, and $CO_2$ produced by cement plants by 30-40%; to increase the period of possible cement storage from 2 months, by international and Russian standards, to a year or longer;
- to reduce the production cost of low-clinker nanocements;
- to reduce expenditures for the transportation of non-metallic materials and to use effectively local raw materials in the concrete production.

Developed nanocements for concrete production make it possible:
- to raise the quality and durability of concrete and reinforced concrete products;
- to attain twice as low (on average) specific consumption of Portland cement in the production of precast and reinforced concrete products with a specified quality;
- to use effectively sub-standard rocks, sand, slag, ash and waste rock in the cement and concrete production;
- to exclude the application of steam hydrothermal treatment of products;
- as follows from the practical assessment of the economic efficiency of low-clinker nanocements, it is possible to save 500-1,500 rubles per cubic meter of concrete, depending on the product range.

The proposed invention will solve all three above-discussed problems of the cement industry development in Russia and other countries. The implementation of this project will make it possible to increase the annual volume of cement production in Russia up to 100 million tons in 2020 pursuant to the STRATEGY 2020 approved by the Government of the Russian Federation, without the construction of new cement plants with clinker burning lines and therefore without fuel costs for burning, without emissions of $NO_x$, $SO_2$, and $CO_2$ due to expanding and increasing the power of grinding zones of existing enterprises that will be redirected into the production of low-clinker nanocements of high quality with the addition of significant (up to 50-70 wt %) amounts of siliceous sands, variable natural rocks, as well as slag and ash that will contribute to the environment improvement in Russia.

The invention claimed is:

1. A method of producing nanocement involving a mechanochemical activation of dispersed grains of Portland cement in the presence of polymeric modifier comprising the steps of:
   - identifying a quantity of Portland cement or Portland cement clinker;
   - identifying a quantity of gypsum stone;
   - identifying a polymeric modifier comprising sodium naphthalenesulfonate at a composition by weight of at least 60% of the polymeric modifier;
   - identifying a siliceous additive;
   - selecting the quantity of Portland cement or Portland cement clinker to have a weight percent of the total composition between 30% and 90%;
   - selecting the quantity of gypsum stone to have a weight percent of the total composition between 0.3-6.0%;
   - selecting the quantity of polymeric modifier to have a weight percent of the total composition between 0.6-2.0%;
   - selecting the siliceous additive to have a balance of the weight percent of the total composition;
   - combining the selected quantity of Portland cement or Portland cement clinker, gypsum stone, polymeric modifier, and siliceous additive in a grinding apparatus, the grinding apparatus configured to reduce an average particle size of the combined materials;
   - grinding the combined materials by the grinding apparatus;
   - wherein the step of grinding forms a nanoshell of sodium naphthalenesulfonate encapsulating a plurality of grains of the quantity of Portland cement or Portland cement clinker; and
   - removing the combined materials after the grinding step after a desired average particle size is achieved by the grinding step.

2. The method of claim 1 wherein the grinding reduces the average particle size such that the ground combination of materials has a specific surface area of between 300-900 $m^2/kg$.

3. The method of claim 1 wherein the grinding apparatus is a ball mill.

4. The method of claim 1 wherein the step grinding causes an average particle size of the siliceous additive and an average particle size of the plurality of grains of Portland cement or Portland cement clinker encapsulated by the nanoshell of sodium naphthalenesulfonate to be approximately equal.

5. The method of claim 4 wherein the step of removing the combined materials comprises removing the combined materials when an average particle size is approximately 2-20 μm.

6. The method of claim 4 wherein the step of removing the combined materials comprises removing the combined materials when an average particle size is approximately 5-20 μm.

7. The method of claim 1 wherein the step of selecting the quantity of Portland cement or Portland cement clinker comprises selecting the quantity of Portland cement or Portland cement clinker to have a weight percent of the total composition between 55% and 90%.

8. The method of claim 1 wherein the step of selecting the quantity of Portland cement or Portland cement clinker comprises selecting the quantity of Portland cement or Portland cement clinker to have a weight percent of the total composition between 30% and 50%.

9. The method of claim 1 wherein the nanoshell encapsulating the plurality of Portland cement or Portland cement clinker particles has an average thickness of 14-120 nm.

10. The method of claim 1 wherein the nanoshell encapsulating the plurality of Portland cement or Portland cement clinker particles has an average thickness of 20-100 nm.

11. The method of claim 1 wherein the selected siliceous additive comprises at least 30% by weight $SiO_2$.

12. The method of claim 1 wherein grinding forms a nanoshell of sodium naphthalenesulfonate continuously encapsulating a plurality of grains of the quantity of Portland cement or Portland cement clinker structured by calcium cations.

13. A nanocement comprising:
    - a quantity of Portland cement or Portland cement clinker, a plurality of Portland cement or Portland cement clinker having a sodium naphthalenesulfonate nanoshell encapsulating each of the plurality of particles, a weight percent of the total composition of the Portland cement or Portland cement clinker between 30% and 90%;
    - a polymeric modifier comprising sodium naphthalenesulfonate having a weight percent of the total composition between 0.6-2.0%;
    - a gypsum stone having a weight percent of the total composition between 0.3-6.0%;
    - a siliceous additive to have a balance of the weight percent of the total composition.

14. The nanocement of claim 13 wherein an average particle size of the siliceous additive and an average particle size of the plurality of grains of Portland cement or Portland cement clinker encapsulated by the nanoshell of sodium naphthalenesulfonate to be approximately equal.

15. The nanocement of claim 13 an average particle size of a plurality of particles comprising the nanocement is approximately 2-20 μm.

16. The nanocement of claim 13 wherein the nanoshell encapsulating the plurality of Portland cement or Portland cement clinker particles has an average thickness of 14-120 nm.

17. The nanocement of claim 13 wherein the nanoshell continuously encapsulates the plurality of grains of the quantity of Portland cement or Portland cement clinker, the nanoshell structured by calcium cations.

18. The nanocement of claim 13 wherein the nanocement has a specific surface area of between 300-900 $m^2$/kg.

* * * * *